March 18, 1958   M. FALK ET AL   2,826,893
CHAIN PIN EXTRACTOR WITH A PLURALITY OF HINGED STOPS
Filed April 26, 1955   2 Sheets-Sheet 1
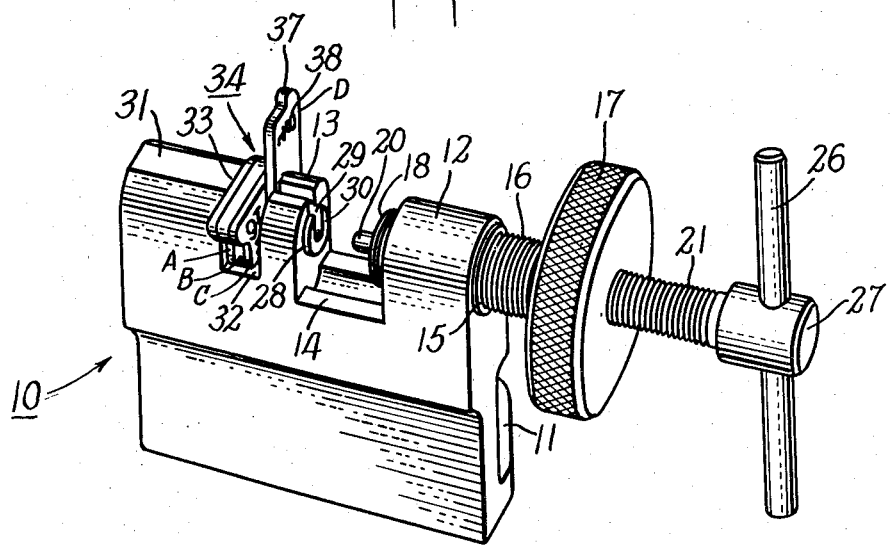
INVENTORS
MORRIS FALK
& WILLIAM WEISMAN
ATTORNEY

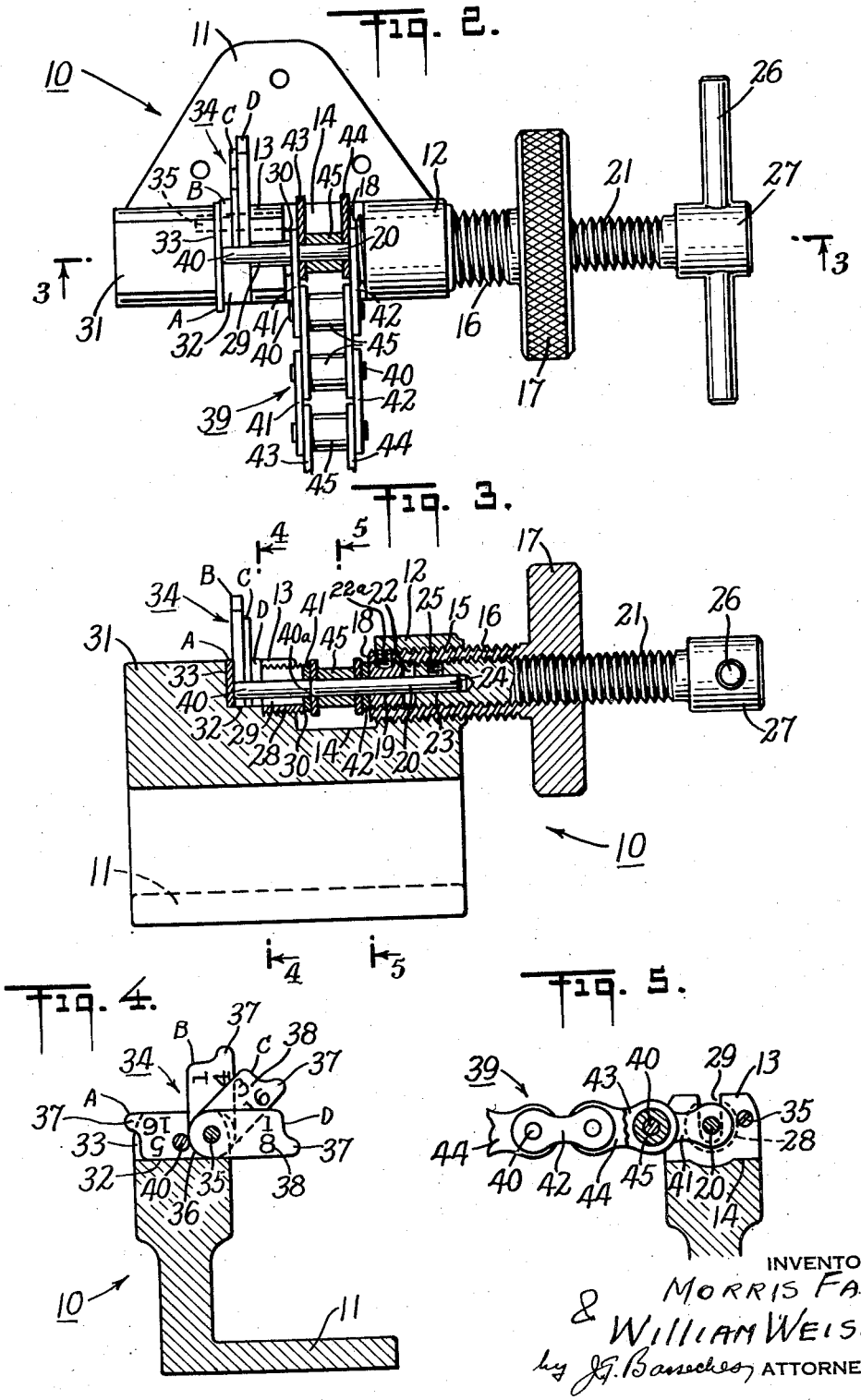

United States Patent Office

2,826,893
Patented Mar. 18, 1958

2,826,893

CHAIN PIN EXTRACTOR WITH A PLURALITY OF HINGED STOPS

Morris Falk, Leominster, Mass., and William Weisman, Hialeah, Fla., assignors to A. M. Collot Supplies, Inc., Dania, Fla., a corporation of Florida Application April 26, 1955, Serial No. 503,992

6 Claims. (Cl. 59—7)

This invention relates to a repair jig for chain belts, more particularly a chain pin extractor therefor; and still more particularly to a jig or a device for extracting and setting of pintles for link chains or drive chains.

Still more particularly, our invention is concerned with providing a novel device which will effect substantial economies in labor and material involved in extracting and setting pins in repairing, lengthening or shortening link or chain belts or chains, and to accomplish this objective without damage to the terminal parts of a length of chain upon which work is being done.

Still more particularly, our invention is concerned with the provision of a tool or jig for servicing chains, such as bicycle chains, chains used in lawn mowers or the like, to facilitate repairs for replacement of worn or broken segments of a chain, but adaptable for accurately and quickly effecting such repairs or replacement with a wide range and variety of sizes and widths of chains.

Our invention is primarily concerned with the repair of chains which include assembled steel chain links arranged in pairs or multiples of pairs and joined to each other by alternate friction reducing sleeves or rollers which encase the coupling or connecting pin or pintle.

In this form of chain, the labor or replacement and repair must be exercised with considerable care because inefficiency or carelessness may not only distort, scratch and warp the bearing surfaces with which the pins are associated, but likewise may damage the moving parts, such as the sprockets of chain driven machinery. Our invention accordingly provides a jig having clamping jaw members to lock a chain segment to be repaired in position with great accuracy and including the features not only of holding the chain and the bearing in position for stripping the pin but to so strip or extract the pin in the links in which one end of the pin is anchored with accuracy, retaining a terminal end in the link, holding the link and pin in readiness for speedy re-assembly of the link bearing and pin.

Still more particularly, it is an object of this invention to provide a jig in which portions of the link chain to be worked on are locked in position, leaving the operator free to use both hands, and for accurately clamping the link in position without distortion, damage or warping of the roller bearing which is mounted upon the coupling pin and to permit extraction of the pin only for the distance necessary to separate or part the link segments which it joins, thereby leaving the pin extended from an outer link through which it passes in readiness for reassembly.

According to our invention, it is an object thereof to combine with a jig provided with clamping means and pin extracting means which may hold a variety of chains, depth control stops to limit the extraction of the connecting pin so that its terminal portion is not warped or damaged, while leaving the pin temporarily anchored in a link segment to await its use in reassembly of the chain members and to permit quick handling of the chain with the pin anchored, thereby further effecting economies in time and labor and providing accuracy of performance of the chain repair and assembly operation.

Still more particularly, it is an object of our invention to provide a jig for repairing drive chains wherein the chain pin may be partially extracted and retained in condition for reuse and to permit retaining the partially assembled pin and chain parts so as to permit bodily removal to economically carry out further replacement and reassembly operations.

To attain these objects and such further objects as may appear herein or be hereinafter pointed out, we make reference to the accompanying drawing, forming a part hereof, in which—

Figure 1 is a perspective view showing a jig in accordance with our invention;

Figure 2 is a plan view thereof;

Figure 3 is a fragmentary section taken on the line 3—3 of Figure 2;

Figure 4 is a section taken on the line 4—4 of Figure 3;

Figure 5 is a section taken on the line 5—5 of Figure 3;

Figure 6 is a plan view of a segment of a chain at an intermediate position.

Making reference to the drawing, we provide a jig 10 having a base 11 with means which may permit its being readily affixed to a bench or the like work area. Extending from the base is an upright having a guide head 12 position opposite to an anvil 13 and forming therebetween a guide slot 14. The guide head 12 is formed axially with a pressure tool guiding boring 15 which, in the form illustrated, is screw-threaded to receive the screw-threaded clamping member 16, which is provided at its external end with a knurled hand-wheel or knob 17. The clamp member 16, which is arranged to be variably extended from the guide head 12, is formed with a pressure face 18 to be projected in to the space defined by the slot 14. Axially thereof, the pressure face 18 is formed with a boring 19 through which an extractor pin 20 is guided. The pin 20 is coupled to the feed member 21, by forming the head 22 with a seat 23 to receive the end 24 of the pin 20 which is guided in the boring 19. A set screw 22a extends radially through the clamp member 16 to hold the feed member 21 relatively thereto.

A set screw 25 removably clamps the pin 20 to the feed member 21 adjacent the inner end thereof. The feed member 21 may be moved relatively to the clamp member 16 and for this purpose the latter is internally threaded in a corresponding boring in said clamp member 16. The feed member 21 is formed with a cross bar or T-shaped handle 26 at its free end 27, to secure a mechanical advantage in manually directing the feed member relatively to the pressure clamp 16.

The anvil 13 is provided with a tempered or hardened filler block 28 which is screw-threaded for replacement in the anvil. Both the block 28 and the anvil 13 are cooperatively slotted at 29 to provide a slot or passage to provide clearance for bodily reception of the pin 20, while exposing a reinforced replaceable bearing surface 30 faced in the direction of the pressure face 18 on the clamp member 16.

Spaced rearwardly from the anvil 13 is a boss 31, outlining a socket 32 with respect of the rear wall of the anvil 13 and presenting a pressure block 33 upon which may bear or abut a plurality of stops 34. The stops are removably held to swing into or out of the socket 32 by being pivotally mounted on the pin 35 supported at its ends in the anvil 13 and boss 31. The stops 34 illustrated have an inner arcuate end 36 concentric with the pin 35 to clear the wall defining the socket 32. The stops 34 are of a length to extend in the path of the slot 29 and extend as far as the face 33. Small tongues 37 extend from each of the stops 34 to project beyond the side wall of the anvil 13 and stud 31, permitting manual selection for tilting movement. Each of the stops 34 is made of varying thickness and carries indicia 38. In the structure as exemplified, the stops carry indicia indicating 1/8, 3/16, 1/4 and 5/16.

It will be observed that by pivoting or hinging the stops 34 in the order of A, B, C, D, to within the socket, a varying amount of limiting stop lengths may be provided, progressively shortening the stop distance upon adding one or more or all of the stops A, B, C, D. Thus, four different and predetermined widths of limiting points of engagement are provided by the stops 34 in respect of the distance to the face 33. Upon pivoting all of the four stops 34, i. e. A, B, C, D, the bearing surface 33 serves as a further or fifth depth control of the distance to the face 30.

With the construction described, a length of chain 39 to be repaired or varied for lengthening or shortening is disposed in the guide slot 14 so that the link pin 40 is axially positioned with respect to the extractor pin 20 and the base of slot or passage 29. The pressure clamp member 16 is then fed into clamping position to engage the outer link members 41 and 42, binding therebetween the inner link members 43 and 44 upon the roller bearing 45, manipulating or rotating the knurled hand wheel 17 for this puropse until the pressure face 18 securely holds the chain in position. Axially, the pin 40 enters the slot 29 on the anvil 13 and the boring 19 through which the pin 20 may be extracted, on the other.

With this construction, and knowing the type of chain, one or more of the stops 34, i. e. A, B, C or D may be shifted into stop engaging position in alignment with the block 31 over the face 33. The stop which is chosen is calculated to give a clearance rearwardly of the surface 30 corresponding to the length of the pin 40 less a predetermined thickness of the outer link 41. With the proper selection of stop, the feed member 21 may be manipulated to drive the extractor pin through the clamp chain. Extraction of the pin 40 will be limited, to retain the edge 40a in the outer link 41, it being understood that the end 40a, having previously been peened, headed, staked or otherwise enlarged, will provide a friction fit of the pin 40 within the outer link.

During clamping of the stack of elements comprising the outer link member 41, 42, the inner link members 43, 44 and the roller 45, the pin 40 is held protected against axial displacement and is shielded from bending or breakage forces, avoiding loss of its efficient bearing surface.

Bodily removal of the chain remnant such as the link 41 may be effected through the slot 29 with the minimum release of the hand wheel 17 partially to retract and release the pressure clamp 16, thereby avoiding accidental displacement of the lightly seated pin in the link.

A chain as thus prepared is more clearly shown in Figure 6 and is now in readiness, upon removal of the roller 45, for repair either to replace, add or remove links, depending upon whether the problem is to repair, lengthen or shorten the chain.

In reassembling the chain with the cross pin 40 in a partially protruding and anchored position in one of the outer link members 41, the chain is reversed to extend the protruding pin into the socket formed by the boring 19 upon retraction of the extractor pin 20. Thereupon the inner link members 43 and 44 are brought into alignment with the overlapping outer link members 41 to clamp the roller 45 therebetween. Thereupon, the feed member 21 is operated by the handle 26 to drive the pin 20 and feed the link pin 40 into coupling engagement progressively with the inner link member 43, the roller 45, the inner link member 44, and finally to enter the boring of the outer link member 42. The end 40a which is thereupon projected through the link members may be staked, peened, headed or otherwise enlarged to prevent displacement, in a manner which is readily understood.

While we have shown and described the use of the hingeable stops 34 for purposes of limiting the distance through which the coupling pin 40 may move, it will be understood that by the removal of all the stops A, B, C, D out of position the pin may be completely pressed out of the chain, should such operation be found desirable, as where the pin is broken. Retention of the other members of the chain in clamping engagement during this operation avoids damage to the borings and the roller bearing.

By construction wherein the extractor pin is guided in the boring hole 19 of the feed member 16, particularly with the additional feature of seating the same in the seat 23 of the feed member while clampingly forcing the work by the use of the pressure face 18 thereof, long life use is assured in the face of the stresses for feeding the feed member 16 to extract the pin 29 or other use thereof, as will be recognized.

While we have described the block 28 as mounted for replacement by being screw threaded, it will be understood that we may support the same in the anvil by a drive fit or hold the same therein by a set screw through the side of the anvil.

By the construction described, pin breakage, damage thereto and to parts thereof, and to the sprockets with which these chains are to be used, as experienced heretofore during repair, is completely eliminated, and efficient handling of the chain parts may be effected to make repairs, replacements, additions or removals.

Having thus described our invention and illustrated its use, what we claim as new and desire to secure by Letters Patent is—

1. A jig for repairing drive link chains or the like to perform work upon the connecting pins thereof having in combination a base, a guide head on said base, a clamping member mounted thereon, an extractor pin coupled with feeding means carried by said clamping member, an anvil member on said base having an opening therethrough aligned with said extractor pin, said base being spaced from and opposed to said guide head forming an opening therebetween on said base and providing a guide for a chain to be repaired and into which opening said clamping member is movably mounted to clamp said chain against the anvil, a pressure block backing said anvil rearwardly thereof and a plurality of separable stops movable into and out of a position in opposed relation to said extractor pin arranged to be superimposed on said block for limiting the protrusion of said connecting pin through a chain link mounted thereon past said anvil and toward said block.

2. A jig for repairing drive link chains or the like to perform work upon the connecting pins thereof having in combination a base, a guide head on said base, a clamping member transversely mounted thereon, an extractor pin coupled with feeding means carried by said clamping member, an anvil member on said base having an opening therethrough aligned with said extractor pin, said base being spaced from said guide head opposed to said guide head forming an opening therebetween on said base and providing a guide for a chain to be repaired and into which opening said clamping member is movably mounted to clamp said chain against the anvil, said anvil being formed with a slot having an open side wall forming a clearance passage through which said connecting pin may be moved with the pin anchored in a link portion of said chain, a pressure block backing for said anvil and support between said block and anvil for a predetermined number of stops movable into and out of a position in opposed relation to said extractor pin for limiting the protrusion of said connecting pin through a chain link mounted thereon by said extractor pin.

3. A jig for repairing drive link chains or the like to perform work upon the connecting pins joining the links thereof having, in combination, a guide head, a clamping member having screw feed means mounted thereon, an extractor pin guided by said member and feed means for said extractor pin carried by said clamping member, an anvil having an opening therethrough aligned with said extractor pin and spaced from said guide head forming a space between said head and anvil into which the link may be held and into which the clamping member and pin may project, said anvil having a clearance slot having an open side wall and hingeable stops movable into and out of a position in opposed relation to said extractor pin having predetermined thickness, spaced from said anvil to limit the protrusion of a connecting pin by said extractor pin through said anvil.

4. A jig for repairing drive link chains to perform work upon the connecting pins joining the links thereof having, in combination, a guide head, a clamping member, an anvil spaced from said head to provide an opening cooperating with said member to hold work therebetween, an extractor pin carried by said member axially thereof and feed means therefor to project the pin into said opening, said anvil having an opening therethrough aligned with the extractor pin and having at its forward portion a bearing face and means for guiding a connecting pin therethrough, a block rearwardly spaced from said anvil and providing an opening therebetween, said block and anvil having means for mounting therebetween movably extendible into and out of said opening in opposed relation to said extractor pin a plurality of predeterminedly sized stop members for selectively limiting the extrusion of the connecting pin through said anvil.

5. A jig for repairing drive link chains to perform work upon the connecting pins joining the links thereof having, in combination, a guide head, a clamping member carried thereby, an anvil spaced from said head to provide an opening cooperating with said member to hold work therebetween, an extractor pin carried by said member axially thereof and feed means therefor to project the pin into said opening, said anvil having an opening therethrough aligned with the extractor pin and having at its forward portion a bearing face and means for guiding a connecting pin therethrough, a block rearwardly spaced from said anvil, said block and anvil providing a second opening having means movably extendible into and out of said last opening for mounting between said anvil and block in opposed relation to said extractor pin a plurality of predeterminedly sized stop members comprising a hinge member supported on said anvil and block for pivotally supporting said stop members selectively on said block member.

6. A jig for repairing drive link chains to perform work upon the connecting pins joining the links thereof having, in combination, a guide head, a clamping member carried thereby, an anvil spaced from said head to provide an opening cooperating with said member to hold work therebetween, an extractor pin carried by said member axially thereof and feed means therefor to project the pin into an opening, said anvil having an opening therethrough aligned with the extractor pin and having at its forward portion a bearing face and means for guiding a connecting pin therethrough, a block rearwardly spaced from said anvil, said block and anvil providing an opening therebetween having means movably extendible into and out of said last opening for mounting in opposed relation to said extractor pin between said anvil and block a plurality of predeterminedly sized stop members each having differing thickness comprising a hinge member supported on said anvil and block for pivotally supporting said stop members selectively on said block member and finger engaging tongues on said stops for manually selecting said stops.

References Cited in the file of this patent

UNITED STATES PATENTS

| | | |
|---|---|---|
| 913,641 | Hammer | Feb. 23, 1909 |
| 922,660 | Bean | May 25, 1909 |
| 1,563,325 | Bielaski | Dec. 1, 1925 |
| 1,763,333 | Vivarttas | June 10, 1930 |
| 2,496,314 | Sherwood | Feb. 7, 1950 |

FOREIGN PATENTS

| | | |
|---|---|---|
| 163,529 | Great Britain | May 26, 1921 |
| 213,780 | Great Britain | Apr. 10, 1924 |
| 917,700 | France | Jan. 17, 1947 |